3,310,476
PROCESS FOR PREPARING A CELLULOLYTIC ENZYME FROM *TRAMETES SUAVEOLENS*

William D. Yerkes, Jr., Appleton, Wis., assignor to Kimberly-Clark Corporation, Neenah, Wis., a corporation of Delaware
No Drawing. Filed Oct. 2, 1964, Ser. No. 401,240
4 Claims. (Cl. 195—66)

This invention relates to the production of a cellulose splitting enzyme of high activity by the isolation of such cellulase from a white rot fungus, *Trametes suaveolens*.

*Trametes suaveolens* is known as a fungus of the white rot type and commonly is expected to display a considerable capacity for attack on the lignin portions of wood. I have found that if the fungus is properly grown, a cellulolytic enzyme of materially enhanced activity with respect to other known cellulolytic enzymes is achieved. A direct comparison with cellulolytic enzymes derived from *Aspergillus niger*, for example, shows that the cellulase of *Trametes suaveolens* has more than twice and up to four times the cellulase solubilizing activity of the former cellulase.

A primary object of my invention, therefore, is the provision of a process for the preparation of a highly active cellulase from the fungus *Trametes suaveolens*.

Another object of my invention is the provision of a process for the preparation of cellulase from the fungus *Trametes suaveolens* which process employs novel carbohydrate sources for the fungus development and enzyme production.

In some detail, the following procedural steps are effective to achieve the desired cellulase:

(1) The preparation of a sterilized nutrient medium containing proteins, mineral salts, water and finely divided wood as a carbohydrate source;

(2) The growth of *Trametes suaveolens* in this nutrient during which growth period the enzymes develop in sufficient quantity to be useful;

(3) The trituration of the culture and separation of the liquid containing the cellulase;

(4) Usually the drying of the liquid to attain the cellulase in powder form;

Alternatively, if purification of the cellulase is desired, after trituration and separation but before freeze drying of the liquid, the following procedural step is effective:

(5) Filter the liquid through a dextran gel (molecular sieving); and (6) Freeze dry the resultant filtrate.

I have found it to be essential that for adequate production of the cellulolytic enzyme that finely divided wood be utilized as the carbohydrate source of food for the growing fungus. While the fungus itself grows well on other carbohydrate media, the enzyme production in such instances is either very low or nil. Ball milling is a suitable means for providing the ground wood.

Additionally, I have found that, if the wood is extracted with hot water prior to introduction to the culture media, the resulting cellulase is improved in its ability to degrade cellulose. In contrast, I have found that prior extraction of the wood with water at about 70° F. makes no appreciable change in the cellulase product; also extraction with ethyl alcohol, including alcohol at the boiling point, not only did not improve the cellulase produced with such extracted wood, but actually tended to be materially inferior in activity. Apparently the hot water action either stimulates a component of the wood in some manner or removes an inhibitor to cellulolytic enzyme development; apparently also the alcohol and cold water treatments are not effective to either effect the possible stimulation or to eliminate an inhibitor if such be present. As noted, the alcohol treatment, in fact, is adverse. The liquid extracts are not employed in the culture media and, therefore, extraction would possibly be effective to eliminate inhibitors to the cellulolytic enzyme development.

Other carbohydrates which result in my process in insignificant or no enzyme production, though useful for growing the fungus, includes sulfate pulp, glucose, cellobiose and viscose.

The woods which are useful, when finely divided, include fir wood, poplar, spruce, aspen, pine, birch, beech, willow and the like.

Certain protein and mineral sources have also been found to be more effective than others in conjunction with the ground wood carbohydrate source. While the conventional neopeptone is useful as a protein source and the usual water soluble salts provide the minerals to result in good cellulase production, the use of cotton seed meal as both the protein and mineral salt source is more effective. No explanation is presently available for the very considerable difference in activity of the end product achieved with the cotton seed meal.

The following examples illustrate the cellulolytic enzyme production.

EXAMPLE 1

The fungus *Trametes suaveolens* is grown in the following medium which medium is sterilized in a suitable autoclave for about 15 minutes and cooled before introduction of the fungus:

| | |
|---|---|
| Spruce wood (ground by ball milling to a fineness of 200 mesh) grams | 10 |
| Neopeptone do | 3 |
| Magnesium sulfate do | 0.5 |
| Potassium acid phosphate do | 1 |
| Potassium chloride do | 0.5 |
| Ferric sulfate do | 0.01 |
| Water liter | 1 |

The pH of this dispersion is adjusted to about 4.9 by adding acetic acid, sodium acetate to buffer the system. Air is bubbled through the liquid medium and the culture is allowed to grow for 14 days at about 70° F. The fungus itself is suitably propagated at a temperature of from about 20° C. to about 30° C. and introduced to the cooled nutrient solution.

During the growth period the suspended wood flour becomes incorporated into the developing mass of fungal mycelium and the supernatant fluid becomes clearer. At the end of 14 days the fungal material is a large pulpy light brown colored mass, relatively soft, and suspended in a clear very light amber colored fluid. The entire system is subjected to trituration in a Waring blendor and filtered through diatomaceous earth. The result of the filtration through diatomaceous earth is that a small amount of disposable residue remains on the filter; the filtrate is light brown or amber in color. This clear amber colored liquid has a not unpleasant spicy odor and chromatographically contains no apparent sugars. This solution which contains the cellulolytic enzyme is dried to a powder by shell freezing and drying under reduced pressure at approximately 40° C. below zero maintained by an isopropyl alcohol, and Dry Ice bath. The powder product is of tannish coloration and a crystalline appearing substance. The weight of the powder attained under the described conditions is about 5 grams. The powder is water soluble and may be reconstituted for use by dissolving at about 70° F. The material is, in fact, highly soluble and substantially any desired concentration may be obtained. This cellulase may be further purified before freeze drying by acetone precipitation and re-hydration techniques or by passage through cross-linked dextran gel or by other conventionally used enzyme purification procedures. Approximately 80% of the material is recovered after dextran filtration in the purification action. The resultant cellulase, whether purified or not, is highly active and, when applied to cellulosic substrates, at a concentration in the range of 0.1 to 1%, for example, is effective to solubilize the cellulose, the extent of solubilization depending upon the concentration and the time of exposure of the cellulose to the enzyme. As much as 85–88% of cellulose fibers have been solubilized by the action of such an enzyme. Also, by the appropriate control as little as about 1% of the cellulosic substrate may be solubilized with the described enzyme system.

EXAMPLE 2

Example 1 was repeated except that the wood substrate was given an initial pre-treatment as follows: the wood flour was Soxhlet extracted with hot water for eight hours. The effect of this extraction is considerable in increasing of the efficacy of the enzyme preparation. During the extraction the liquid changed in color to a dark brown, due to the materials extracted. Soxhlet extraction is not critical for the purpose but the extracting water should be quite hot; the time will vary with the temperature. 90° C. for about 4 hours appears suitable. The liquid extract is discarded.

The product produced in accordance with this Example 2 solubilized 62% of unbeaten sulfate pulp fibers in contrast to about 21% solubilized by the product of Example 1 at the same concentration and during the same period of time exposure. The concentration of the enzyme was 1% weight per volume, the time of exposure 48 hours, and the quantity of liquid was that sufficient to wet the pulp.

EXAMPLE 3

Example 1 was repeated but in this instance the ground wood flour was extracted with water at a temperature of about 70° F. for a period of eight hours. The liquid of the extract changed color to a light tan color and this liquid was discarded. The ground wood thus extracted, when subjected to the procedure described in Example 1, resulted in a product having about the same cellulolytic capacity as that of Example 1. In this instance about 20% of the sulfate pulp on the comparative basis noted in Example 2 was solubilized by the action of the enzyme.

Repeated experiments in accordance with Examples 1, 2 and 3 clearly indicate that the hot water extracted ground wood flour is superior as the fungus substrate for the production of the enzyme.

EXAMPLE 4

Example 1 was again repeated except that ground defatted cotton seed meal was substituted for the neopeptone and mineral salts in the culture medium. The resultant enzyme had a capacity superior to that of Example 1 with respect to cellulolytic activity. Whereas the product of Example 1 solubilized 23% of the cellulose on the noted comparative basis, in this instance 86% of the cellulose was solubilized. This has been found to be an optimum situation whether or not the wood is first extracted. However, at lower concentration and lower times of exposure, in the usage of the cellulolytic enzyme, it has been found that it is preferable to extract the wood initially with hot water in order to secure the optimum effect. Apparently about 85% and above is the maximum which this enzyme will degrade with this type of substrate (sulfate pulp).

Curiously, as already noted generally, when wood was subjected to boiling alcohol, for a period of eight hours, washed free of alcohol and then utilized as in Example 1, the resultant cellulase product with this alcohol extracted wood serving as a carbohydrate source was inferior to the product of Example 1. In fact, very little enzyme was attained. A repeated series of experiments established that alcohol extraction of the wood is undesirable.

I have found that the temperature of the growing nutrient medium is preferably maintained between about 20° C. and 30° C. but may vary from about 5° C. to 40° C. Also, the pH should be maintained between about 3.5 to 7.5.

Importantly, however, the mesh size of the wood for growth of the fungus within a reasonable time period should be relatively fine and between about 200 mesh to 800 mesh is preferred, although 2 mesh to the inch wood may successfully be employed when the growth is permitted to occur over a period of weeks, approximately six to eight weeks.

The enzyme or cellulase produced as described is useful quite generally in cellulose removal. The concentration commonly employed with the unpurified material is normally between about 0.1 to 1%. The extent of cellulase action is dependent upon the time of contact with the cellulosic substrate, the concentration, the temperature—which is normally between 20° C. and 35° C.—and the nature of the substrate itself. Cellulosic material in the form of fibers is readily attacked—the more fine the material, the quicker the action. Thus, the cellulase has utility in pulping and refining procedures for papermaking operations, cleaning procedures, solution clarification as in cellulose-containing beverages, and the like. I have found that it also serves the general purposes of other cellulases and is more active on cellulose itself than available commercial cellulases.

My invention thus resides in the provision of a process for the production of a novel cellulase from a wood rotting fungi *Trametes suaveolens,* and I claim the same broadly.

What is claimed is:

1. The process of producing a cellulolytic enzyme which comprises the step of growing *Trametes suaveolens* on a culture substrate which includes as a carbohydrate source finely divided wood and also a protein and mineral element source, and separating out the cellulolytic enzyme.

2. The method of producing a cellulase of *Trametes suaveolens* derivation which comprises grinding wood to a mesh size of from about 2 mesh to about 800 mesh, forming an aqueous nutrient medium including proteins and mineral salts and the ground wood as a source of carbohydrate, sterilizing the nutrient medium, growing the fungus *Trametes suaveolens* in the nutrient medium to thereby produce a cellulase, and separating out the cellulase.

3. In the production of a cellulase of *Trametes suaveolens* derivation, the process which comprises grinding wood to a mesh size of from about 200 mesh to about 800 mesh, heating the ground wood in water to cause swelling of the wood and to extract the ground wood, forming an aqueous medium containing proteins and mineral salts and also the water swollen ground wood as a source of carbohydrates, sterilizing the nutrient medium, growing the fungus *Trametes suaveolens* in the nutrient medium to thereby produce a cellulase, and separating out the cellulase.

4. The method of producing a cellulase of *Trametes suaveolens* derivation which comprises grinding wood to a mesh size of from about 200 mesh to about 800 mesh, forming an aqueous nutrient medium containing cottonseed meal as a source of protein and mineral salts and containing also the ground wood as a source of carbohydrate, sterilizing the nutrient medium, growing the fungus

*Trametes suaveolens* in the nutrient medium to thereby produce a cellulase, and separating out the cellulase.

References Cited by the Examiner

UNITED STATES PATENTS 3,097,145  7/1963  Shimazono et al. ------ 195—62
3,186,921  6/1965  Rupe ---------------- 196—66

OTHER REFERENCES

Birkinshaw, A. B., et al., Biochemical Journal, 38, 131–132 (1944).

Mandels, M., et al., Journal of Bacteriology, 79, 816–826 (1960).

A. LOUIS MONACELL, *Primary Examiner.*

L. M. SHAPIRO, *Assistant Examiner.*